United States Patent [19]
Fujiwara et al.

[11] Patent Number: 5,721,588
[45] Date of Patent: Feb. 24, 1998

[54] VIDEO CODING DEVICE

[75] Inventors: Yoichi Fujiwara; Hiroshi Kusao, both of Chiba; Toshiyuki Miyake, Tenri; Hiroyuki Katata; Tomoko Aono, both of Chiba, all of Japan

[73] Assignee: Sharp Kabushiki Kaisha, Osaka, Japan

[21] Appl. No.: 417,222

[22] Filed: Apr. 5, 1995

[30] Foreign Application Priority Data

Jul. 29, 1994 [JP] Japan ................................. 6-178064

[51] Int. Cl.$^6$ ........................... H04N 7/36; H04N 7/50
[52] U.S. Cl. ................................ 348/402; 348/416
[58] Field of Search .................... 348/400, 402, 348/416; H04N 7/36, 7/50

[56] References Cited

U.S. PATENT DOCUMENTS

| | | | |
|---|---|---|---|
| 5,091,782 | 2/1992 | Krause | 348/402 |
| 5,317,397 | 5/1994 | Odaka | 348/416 |
| 5,412,435 | 5/1995 | Nakajima | 348/416 |

FOREIGN PATENT DOCUMENTS 0 508 351 A2  10/1992  European Pat. Off. .

5-91500  4/1993  Japan .

OTHER PUBLICATIONS

"Adaptive frame/field motion compensated video coding", Puri et al, *Signal Processing: Image Communication*, vol. 5, No. 1/2, 1 Feb. 1993, pp. 39 through 58.

*Primary Examiner*—Howard W. Britton
*Attorney, Agent, or Firm*—Nixon & Vanderhye P.C.

[57] ABSTRACT

The prediction error value calculated by a motion estimating portion is used for selecting the frame or field orthogonal transform coding mode. The frame prediction error value EFr and the field prediction error value EFi are calculated by the motion estimating portion and entered into a comparator of an orthogonal transform mode selecting portion which in turn compares them with each other and generates an orthogonal transform mode selecting signal TC. The use of the prediction error values for selecting the orthogonal transform mode makes it possible to reduce the size of the necessary hardware and saves much time of data processing necessary for judgment of the orthogonal transform mode selection.

5 Claims, 10 Drawing Sheets

Fig. 14(b) LATCH OUTPUT OF MVx 
Fig. 14(c) LATCH OUTPUT OF MVy 
Fig. 14(d) SEL 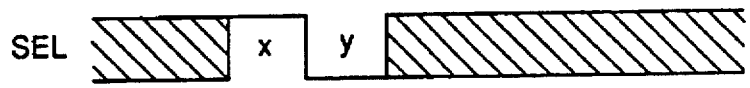
Fig. 14(e) OUTPUT OF SWTCH 
Fig. 14(f) $\overline{OE2}$ 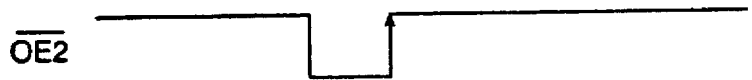
Fig. 14(g) OUTPUT 

VIDEO CODING DEVICE

BACKGROUND OF THE INVENTION

The present invention relates to a video coding device and more particularly to a video coding device which is capable of selecting either of two suitable orthogonal transform modes, i.e., frame-by-frame or field-by-field orthogonal transform coding modes according to a determination based on motion predictive information, and which, thereby, realizes a simplified structure of its hardware without any impairment of image quality.

A frame-and-field adaptive interframe video-coding method is known, which can selectively use frame-by-frame motion prediction or field-by-field motion prediction, intraframe coding or interframe coding, frame-by-frame orthogonal transform or field-by-field orthogonal transform for digital transmitting or recording video information extracted by interlaced scanning.

The general frame-and-field adaptive type interframe video-coding device which comprises an input terminal, a subtracter, a intraframe-interframe coding-mode selecting portion, a change-over switch, a frame-to-field converter, an orthogonal transform mode selecting portion, a change-over switch, an orthogonal transform coder, a multiplexor (MUX), an output terminal, an orthogonal transform decoder, a field-to-frame converter, a change-over switch, an adder, a change-over switch, a frame memory, a predictor and a motion estimating portion.

A frame to be coded is divided into macro-blocks each consisting of 2N×2N pixels and inputted into the coding device through the input terminal. These inputted macro-blocks are indicated by X. A macro-block X has an interlaced structure, i.e., odd-numbered lines correspond to pixels of odd-numbered fields in the macro-block X and even-numbered lines correspond to pixels of even-numbered fields in the macro-block X.

By using the macro-block X and a reference frame stored in the frame memory, the motion estimating portion calculates a motion vector MV and, at the same time, decides which of the frame-by-frame and the field-by-field prediction modes is suitable and produces a prediction mode selecting signal PC. Hereinafter, the prediction to be made per frame is called frame prediction mode and the prediction to be made per field is called field prediction mode. The number of motion vectors is one per macro-block for frame prediction mode and two per macro-block (one vector for an odd-numbered field and one vector for an even-numbered field) for field prediction mode. For bidirectional prediction referring to preceding and succeeding reference frames, the number of vectors is two times the above-mentioned corresponding number.

The predictor calculates a predictive macro-block P according to a motion vector MV and a prediction mode selecting signal PC. Namely, a frame predictor generates a frame-predictive macro-block PFr and a field predictor generates a field-predictive macro-block PFi. A change-over switch selects one of macro-blocks PFr and PFi according to the prediction mode selecting signal PC. The selected macro-block is denoted by P.

The subtracter determines a difference between macro-blocks X and P to obtain a interframe differential macro-block E. The intraframe-interframe coding-mode selecting portion compares the macro-block X with the macro-block E, decides which macro-block X or E is to be encoded and generates a coding-mode selecting signal EC to operate the change-over switch. The intraframe coding mode is applied when X is selected and the interframe coding mode is applied when E is selected. The macro-block selected by the change-over switch is designated by Fr. This macro-block Fr has an interlaced structure.

The macro-block Fr is transferred to the frame-to-field converter wherein it is subjected to frame-to-field conversion. The rearranged macro-block is denoted by Fi. The upper half of the macro-block Fi is composed of 2N×N pixels of the odd-numbered fields and the lower half is composed of 2N×N pixels of the even-numbered fields.

The orthogonal transform-mode selecting portion judges which macro-block Fr or Fi is to be encoded by orthogonal transform coding method, generates an orthogonal transform-mode selecting signal TC to effect the change-over switch to select either one of macro-blocks Fr and Fi. The selected block is denoted by B. The orthogonal transform coder encodes the selected macro-block B of 2N×2N pixels by orthogonal transformation in 4 blocks (upper left, upper right, lower left and lower right), each having N×N pixels. The frame orthogonal transform coding mode is applied when Fr is selected and the field orthogonal transform coding mode is applied when Fi is selected.

An output Y of the orthogonal transform coder is multiplexed with the mode signals TC, EC and PC and a motion vector MV by the multiplexor which generates, at its output terminal, a multiplexed output Z to be transmitted or recorded. To obtain an image reproducible at a decoding side, a coding side performs the decoding operation simultaneously with the coding operation and stores a decoded macro-block in the frame memory. The encoded data Y enters into the orthogonal transform decoder which decodes the data by orthogonal transformation and obtains a decoded macro-block Fr'.

The field-to-frame converter converts the macro-block Fr' into frame arrangement by reversing the procedure of the frame-to-field conversion. The converted macro-block is denoted by Fi'. Either of the macro-blocks Fr' and Fi' is selected by the change-over switch according to the orthogonal transform mode selecting signal TC. The macro-block Fr' is selected for the frame orthogonal transform mode and the macro-block Fi' is selected for the field orthogonal transform mode.

The adder adds a selected macro-block X' to a predictive macro-block P to obtain a resulting macro-block E'. Either of the macro-blocks X' and E' is selected by the change-over switch according to the intraframe-interframe coding mode selecting signal EC. The macro-block X' is selected for the intraframe coding mode and the macro-block E' is selected for the interframe coding mode. A decoded macro-block D' is thus obtained. On completion of processing one frame, there is obtained a complete decoded frame which will be used as a reference frame for coding a further frame.

To assure adaptability for decoding starting from the halfway point of the sequence, the above-mentioned coding method usually periodically inserts a frame whose macro-blocks are all intraframe-coded in the intraframe coding mode. Any frame other than the intraframe-coded frame is hereinafter called an interframe-prediction coded frame. A first method for changing-over the frame orthogonal transform mode to the field orthogonal transform mode and vice versa is "MPEG2 interframe prediction method" which is disclosed in Technical Review of the TV Conference, Vol. 16, No. 61, pp. 37–42. The summary of this method is as follows: A maximum frequency power (in sense of Hadamard's transform) in the vertical direction of the macro-block Fr and a total of maximum frequency power values in vertical direction of two fields (an upper half and a lower half of the macro-block Fi) are compared with each other. The field-transform mode is selected when the former is larger than the latter, whereas the frame-transform mode selected when the latter is larger than the former.

An orthogonal transform mode selecting portion according to the above-mentioned method has two vertical maximum frequency power calculators and a comparator.

The macro-blocks Fr and Fi are transferred to the vertical maximal frequency power calculators respectively. The power values calculated by the calculators for the macro-blocks Fr and Fi are compared with each other by the comparator to decide a transform mode TC to be selected. The vertical maximum frequency power has the following expression (1):

$$\sum_{y=2}^{2N} \sum_{x=1}^{2N} (O(x, y) - O(x, y-1))^2 \qquad (1)$$

(y is an even number.)

where $x(1 \leq x \leq 2N)$ is the abscissa of a pixel in a macro-block, $y(1 \leq y \leq 2N)$ is the ordinate of a pixel in a macro-block and $O(x,y)$ is a pixel value of the coordinates in a macro-block.

The vertical maximal frequency power calculating portion includes change-over switches, a delay circuit, a subtracter, a multiplier, an adder, a register, a latch and a control portion.

The change-over switches operate, respectively, once a line of the block. When pixels of an odd-numbered line enters they are switched to the one side, and when pixels of an even-numbered line enters they are switched to the other side. The delay circuit can delay the input by 2N pixels. Accordingly, $O(x,y)$ and $O(x,y-1)$ are inputted to the subtracter. The output "$O(x,y)-O(x,y-1)$" of the subtracter is squared by the multiplier and accumulatively added to the preceding sum by the adder and the register.

The addition according to the equation (1) is carried out only when y is an even number. Accordingly, if y is an odd number the input of the multiplier is held at 0 by the action of the change-over switch not to change the accumulated value. The latch is controlled to maintain a result of accumulation for one block only. On completion of accumulation of one block the register is reset for calculation of a succeeding block. The control portion controls a series of the above-mentioned operations.

Japanese Laid-open Patent Publication No. 5-91500 discloses a highly efficient video CODEC device which uses the second method for changing-over from the frame orthogonal transform mode to the field orthogonal transform mode and vice versa, which will be described below:

Differential values EFD and EFM, which are defined by the following equation, are calculated for a macro-block Fr. The field orthogonal transform mode is applied if a difference between differential values EFM and EFD exceeds a certain threshold (i.e., EFM−EFD>T2), and the frame orthogonal transform mode is applied in the other case than the above-mentioned.

$$EFD = \sum_{x=1}^{2N} \sum_{y=1}^{N-1} (|O(x, 2y-1) - O(x, 2y+1)| + \qquad (2)$$
$$|O(x, 2y) - O(x, 2y+2)|)$$

$$EFM = \sum_{x=1}^{2N} \sum_{y=1}^{N-1} (|O(x, 2y-1) - O(x, 2y)|) + \qquad (3)$$

$$\sum_{x=1}^{2N} \sum_{y=1}^{N-1} (|O(x, 2y) - O(x, y+1)|)$$

The equations (2) and (3) correspond to the equation (1) whose squared value is substituted by absolute value for Fi and Fr respectively.

The methods use data on macro-block pixels to discriminate which mode of the frame orthogonal transform mode and field orthogonal transform mode is to be conducted.

The first method requires a hardware for calculating a vertically maximal frequency power for selecting the frame orthogonal transform mode or the field orthogonal transform mode. This hardware includes at least a multiplier, two adders, a memory for delay line and a control circuit and is, therefore, of considerably large size. In addition, the maximal frequency power calculation must be conducted for a frame macro-block (Fr) and a field macro-block (Fi), which requires the doubled scale of the hardware.

On the other hand, the second method has no need of multipliers. Therefore, the hardware necessary to effect the method is correspondingly reduced in comparison with the first method but still large in scale. Both the first and second methods use data on all pixels in each macro-block to judge which one of the frame mode and field mode to select. As a result, both methods must treat with a large number of input data and perform much time-consumable operations for data processing.

SUMMARY OF THE INVENTION

It is an object of the present invention to provide a video coding device which is capable of adaptively selecting frame or field orthogonal transform mode according to a determination based on a motion prediction information, assuring prevention of impairment of image quality without enlargement of its hardware.

It is another object of the present invention to provide a video coding device which is capable of performing the interframe video coding with adaptively selecting either frame or field orthogonal transform mode by using a prediction error value of the frame predictive mode, a prediction error value of the field predictive mode and motion vectors, and which is featured by the prediction error values calculated respectively in the frame prediction mode and in the field prediction mode which are compared with each other to determine which one is larger than the other and the orthogonal transform mode is selected.

It is another object of the present invention to provide a video coding device which is capable of dividing each frame of a video sequence obtained by interlaced scanning into codable blocks and generating predicted image blocks from a preceding-frame and a succeeding frame by using motion vectors determined by estimation, the estimation being performed in one of selective modes comprising a frame prediction mode to predict by using a motion vector per codable block and a field prediction mode to predict by using motion vectors per respective odd-numbered field consisting of odd-numbered lines and even-numbered field consisting of even-numbered lines, comprising a motion estimating portion for determining an error value of frame mode prediction and an error value of field mode prediction and an orthogonal transform mode selecting portion for adaptively selecting a field orthogonal transform mode when the error value of the frame-mode prediction is larger than the error value of the field mode prediction and selecting a frame orthogonal transform mode when the error value of the frame mode prediction is smaller than an error value of the field mode prediction.

PREFERRED EMBODIMENTS OF THE INVENTION

Figure 1:
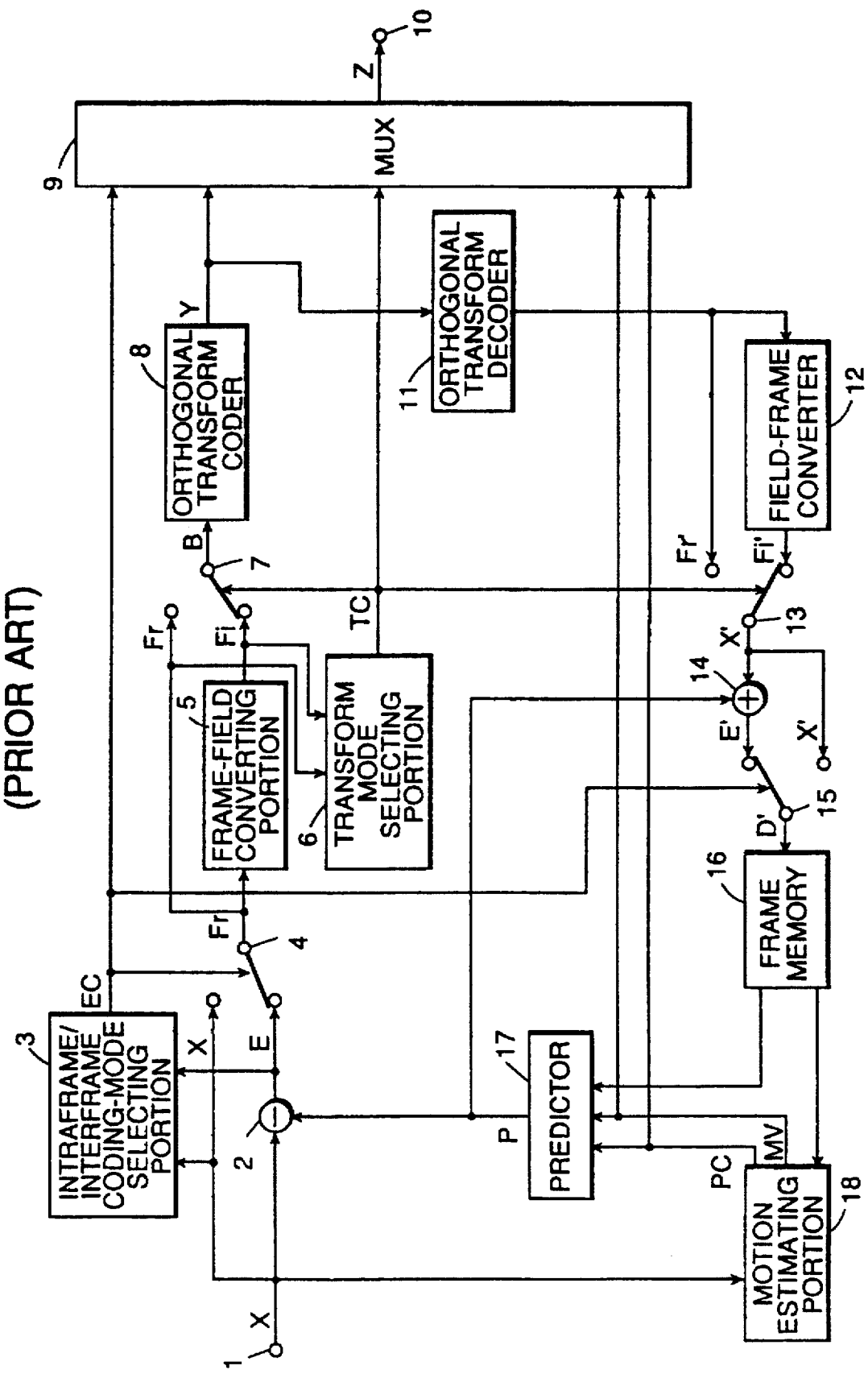
FIG. 1 is a block diagram of a conventional frame-field adaptable interframe-coding device.

FIG. 1 is a block diagram showing a general frame-and-field adaptive type interframe video-coding device which comprises an input terminal 1, a subtracter 2, a intraframe-interframe coding-mode selecting portion 3, a change-over switch 4, a frame-to-field converter 5, an orthogonal transform mode selecting portion 6, a change-over switch 7, an orthogonal transform coder 8, a multiplexor (MUX) 9, an output terminal 10, an orthogonal transform decoder 11, a field-to-frame converter 12, a change-over switch 13, an adder 14, a change-over switch 15, a frame memory 18, a predictor 17 and a motion estimating portion 18.

A frame to be coded is divided into macro-blocks each consisting of 2N×2N pixels and inputted into the coding device through the input terminal 1. These inputted macro-blocks are indicated by X. A macro-block X has an interlaced structure, i.e., odd-numbered lines correspond to pixels of odd-numbered fields in the macro-block X and even-numbered lines correspond to pixels of even-numbered fields in the macro-block X.

By using the macro-block X and a reference frame stored in the frame memory 16, the motion estimating portion 18 calculates a motion vector MV and, at the same time, decides which of the frame-by-frame and the field-by-field prediction modes is suitable and produces a prediction mode selecting signal PC. Hereinafter, the prediction to be made per frame is called frame prediction mode and the prediction to be made per field is called field prediction mode. The number of motion vectors is one per macro-block for frame prediction mode and two per macro-block (one vector for an odd-numbered field and one vector for an even-numbered field) for field prediction mode. For bidirectional prediction referring to preceding and succeeding reference frames, the number of vectors is two times the above-mentioned corresponding number.

Figure 2:
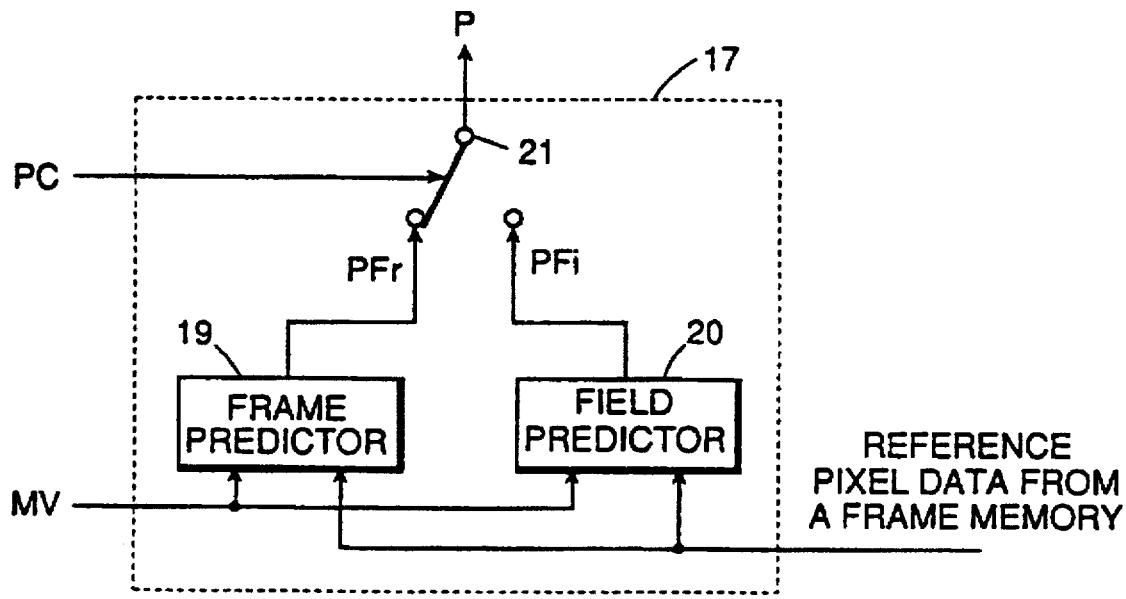
FIG. 2 is a block diagram of an ordinary predicting unit.

FIG. 2 is a block diagram showing a general configuration of the predictor included in the device of FIG. 1. Numeral 19 indicates a frame predictor, numeral 20 a field predictor and numeral 21 a change-over switch. The predictor 17 calculates a predictive macro-block P according to a motion vector MV and a prediction mode selecting signal PC. Namely, the frame predictor 19 generates a frame-predictive macro-block PFr and the field predictor 20 generates a field-predictive macro-block PFi. The change-over switch 21 selects one of macro-blocks PFr and PFi according to the prediction mode selecting signal PC. The selected macro-block is denoted by P.

The subtracter 2 determines a difference between macro-blocks X and P to obtain a interframe differential macro-block E. The intraframe-interframe coding-mode selecting portion 3 compares the macro-block X with the macro-block E, decides which macro-block X or E is to be encoded and generates a coding-mode selecting signal to operate the change-over switch 4. The intraframe coding mode is applied when X is selected and the interframe mode is applied when E is selected. The macro-block selected by the change-over switch is designated by Ft. This macro-block Fr has an interlaced structure.

Figure 3:
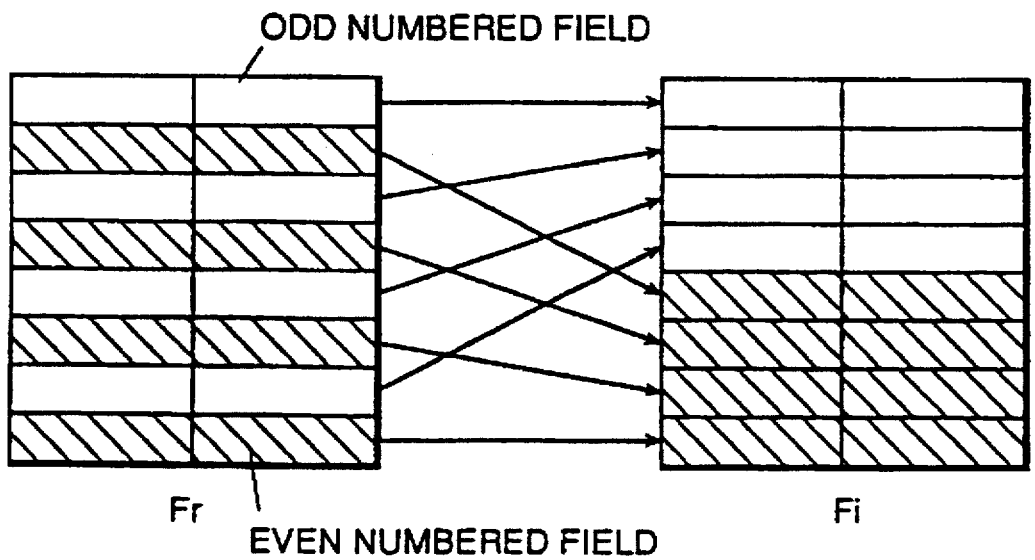
FIG. 3 shows a conventional frame-field converting process.

The macro-block Fr is transferred to the frame-to-field converter 5 wherein it is subjected to frame-to-field conversion, i.e., it is rearranged into lines as shown in FIG. 3. The rearranged macro-block is denoted by Fi. The upper half of the macro-block Fi is composed of 2N×N pixels of the odd-numbered fields and the lower half is composed of 2N×N pixels of the even-numbered fields.

The orthogonal transform-mode selecting portion 6 judges which macro-block Fr or Fi is to be encoded by orthogonal transfer coding method, generates an orthogonal transform-mode selecting signal TC to effect the change-over switch 7 to select either one of macro-blocks Fr and Fi. The selected block is denoted by B. The orthogonal transform coder 8 encodes the selected macro-block B of 2N×2N pixels by orthogonal transformation in 4 blocks (upper left, upper right, lower left and lower right), each having N×N pixels. The frame orthogonal transform coding mode is applied when Fr is selected and the field orthogonal transform coding mode is applied when Fi is selected.

An output Y of the orthogonal transform coder 8 is multiplexed with the mode signals TC, EC and PC and a motion vector MV by the multiplexor 9 which generates, at its output terminal 10, a multiplexed output Z to be transmitted or recorded. To obtain an image reproducible at a decoding side, a coding side performs the decoding operation simultaneously with the coding operation and stores a decoded macro-block in the frame memory 16. The encoded data Y enters into the orthogonal transform decoder 11 which decodes the data by orthogonal transformation and obtains a decoded macro-block Fr'.

The field-to-frame converter 12 converts the macro-block Fr' into frame arrangement by reversing the procedure of the frame-to-field conversion. The converted macro-block is denoted by Fi'. Either of the macro-blocks Fr' and Fi' is selected by the change-over switch 13 according to the orthogonal transform mode selecting signal TC. The macro-block Fr' is selected for the frame orthogonal transform mode and the macro-block Fi' is selected for the field orthogonal transform mode.

The adder 14 adds a selected macro-block X' to a predictive macro-block P to obtain a resulting macro-block E'. Either of the macro-blocks X' and E' is selected by the change-over switch 15 according to the intraframe-interframe coding mode selecting signal EC. The macro-block X' is selected for the intraframe coding mode and the macro-block E' is selected for the interframe coding mode. A decoded macro-block D' is thus obtained. On completion of processing one frame, there is obtained a complete decoded frame which will be used as a reference frame for coding a further frame.

To assure adaptability for decoding starting from the halfway point of the sequence, the above-mentioned coding method usually periodically inserts a frame whose macro-blocks are all intraframe-coded in the intraframe coding mode. Any frame other than the intraframe-coded frame is hereinafter called an interframe-prediction coded frame. A first method for changing-over the frame orthogonal transform mode to the field orthogonal transform mode and vice versa is "MPEG2 interframe prediction method" which is disclosed in Technical Review of the TV Conference, Vol. 16, No. 61, pp. 37–42. The summary of this method as follows: A maximum frequency power (in sense of Hadamard's transform) in the vertical direction of the macro-block Fr and a total of maximum frequency power values in vertical direction of two fields (an upper half and a lower half of the macro-block Fi) are compared with each other. The field-transform mode is selected when the former is larger than the latter, whereas the frame-transform mode selected when the latter is larger than the former.

Figure 4:
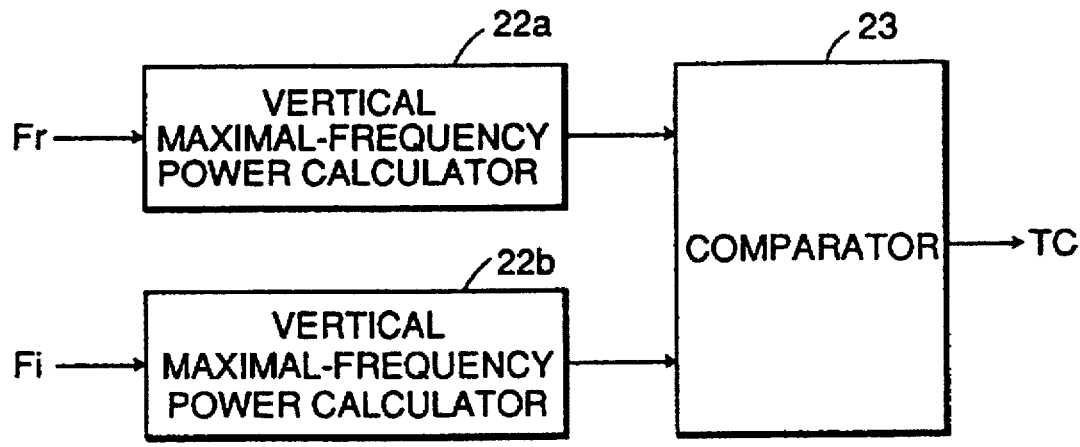
FIG. 4 is a block diagram of an ordinary orthogonal transform mode selecting portion shown in FIG. 1.

FIG. 4 is a block diagram of an orthogonal transform mode selecting portion according to the above-mentioned method. In FIG. 4, numerals 22a and 22b designate vertical-maximum frequency power calculators and numeral 23 designates a comparator.

The macro-blocks Fr and Fi are transferred to the vertical maximal frequency power calculators 22a and 22b respectively. The power values calculated by the calculators 22a and 22b for the macro-blocks Fr and Fi are compared with each other by the comparator 23 to decide a transform mode TC to be selected. The vertical maximum frequency power has the following expression (1):

$$\sum_{y=2}^{2N} \sum_{x=1}^{2N} (O(x, y) - O(x, y-1))^2 \quad (1)$$

(y is an even number.)

where $x(1 \leq x \leq 2N)$ is the abscissa of a pixel in a macro-block, $y(1 \leq y \leq 2N)$ is the ordinate of a pixel in a macro-block and $O(x,y)$ is a pixel value of the coordinates in a macro-block.

Figure 5:
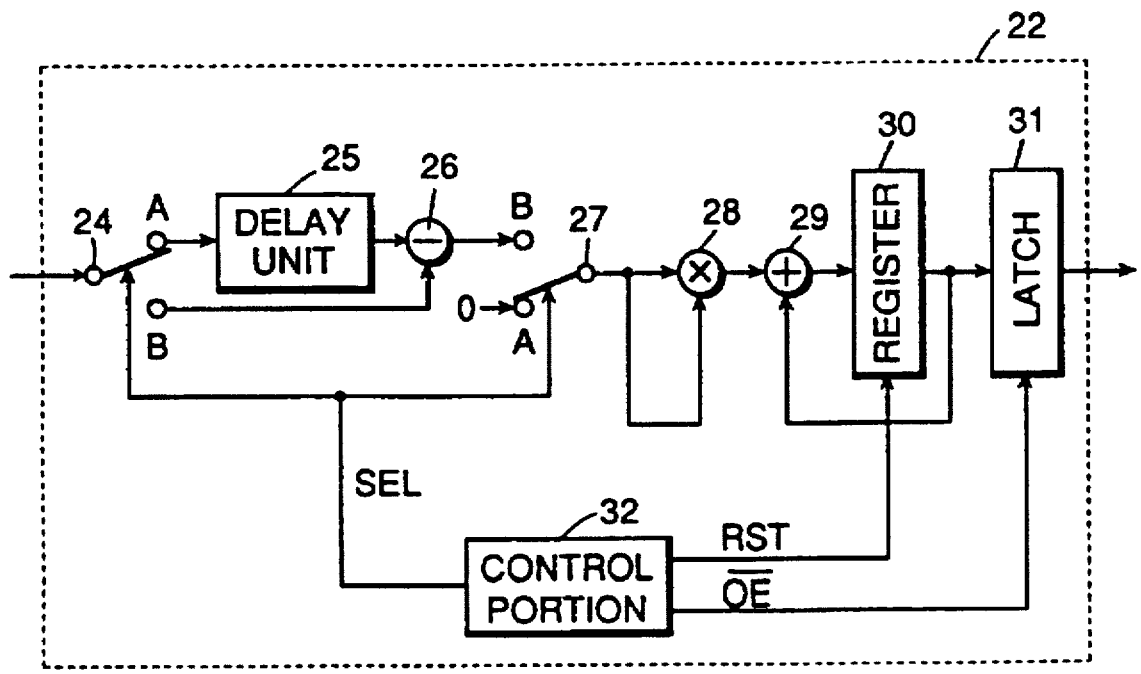
FIG. 5 is a block diagram of a maximal frequency power calculating portion shown in FIG. 4.

FIG. 5 is a block diagram of the vertical maximal frequency power calculating portion shown in FIG. 4, which includes change-over switches 24, 27, a delay circuit 25, a subtracter 26, a multiplier 28, an adder 29, a register 30, a latch 31 and a control portion 32. The change-over switches 24 and 27 operate, respectively, once a line of the block. When a pixel of an odd-numbered line enters they are switched to the side A, and when a pixel of an even-numbered line enters they are switched to the side B. The delay circuit 25 can delay the input by 2N pixels. Accordingly, $O(x,y)$ and $O(x,y-1)$ are inputted to the subtracter 26. The output "$O(x,y)-O(x,y-1)$" of the subtracter 26 is squared by the multiplier 28 and accumulatively added to the preceding sum by the adder 29 and the register 30.

The addition according to the equation (1) is carried out only when y is an even number. Accordingly, if y is an odd number the input of the multiplier 28 is held at 0 by the action of the change-over switch 27 not to change the accumulated value. The latch 31 is controlled to maintain a result of accumulation for one block only. On completion of accumulation of one block the register 30 is reset for calculation of a succeeding block. The control portion 32 controls a series of the above-mentioned operations.

Japanese Laid-open Patent Publication No. 5-91500 discloses a highly efficient video CODEC device which uses the second method for changing-over from the frame orthogonal transform mode to the field orthogonal transform mode and vice versa, which will be described below:

Differential values EFD and EFM, which are defined by the following equation, are calculated for a macro-block Fr. The field orthogonal transform mode is applied if a difference between differential values EFM and EFD exceeds a certain threshold (i.e., EFM−EFD>T2), and the frame orthogonal transform mode is applied in the other case than the above-mentioned.

$$EFD = \sum_{x=1}^{2N} \sum_{y=1}^{N-1} (|O(x, 2y-1) - O(x, 2y+1)| + \quad (2)$$

$$|O(x, 2y) - O(x, 2y+2)|)$$

$$EFM = \sum_{x=1}^{2N} \sum_{y=1}^{N-1} (|O(x, 2y-1) - O(x, 2y)|) + (3)$$

$$\sum_{x=1}^{2N} \sum_{y=1}^{N-1} (|O(x, 2y) - O(x, y+1)|)$$

The equations (2) and (3) correspond to the equation (1) whose squared value is substituted by absolute value for Fi and Fr respectively.

The methods use data on macro-block pixels to discriminate which mode of the frame orthogonal transform mode and field orthogonal transform mode is to be conducted.

The first method requires hardware for calculating a vertically maximal frequency power for selecting the frame orthogonal transform mode or the field orthogonal transform mode. This hardware includes at least a multiplier, two adders, a memory for delay line and a control circuit and is, therefore, of considerably large size. In addition, the maximal frequency power calculation must be conducted for a frame macro-block (Fr) and a field macro-block (Fi), which requires the doubled scale of the hardware.

On the other hand, the second method has no need of adders. Therefore, the hardware necessary to effect the method is correspondingly reduced in comparison with the first method but still large in scale. Both the first and second methods use data on all pixels in each macro-block to judge which one of the frame mode and field mode to select. As the result, both methods must treat with a large number of input data and perform much time-consumable operations for data processing.

In view of the foregoing, the present invention was made to provide a video coding device which is capable of adaptively selecting frame or field orthogonal transform mode according to the judgment based on a motion prediction information, assuring prevention of impairment of image quality without enlargement of its hardware.

To solve the above-mentioned problems, the present invention provides:

(1) a video coding device capable of dividing each frame of a video sequence obtained by interlaced scanning into codable blocks and generating predicted image blocks from a preceding-frame and a succeeding frame by using motion vectors determined by estimation, said estimation being performed in one of selective modes comprising a frame prediction mode to predict by using a motion vector per codable block and a field prediction mode to predict by using motion vectors per respective odd-numbered field consisting of odd-numbered lines and even-numbered field consisting of even-numbered lines, comprising a motion estimating portion for determining an error value of frame mode prediction and an error value of field mode prediction and an orthogonal transform mode selecting portion for adaptively selecting a field orthogonal transform mode when the error value of the frame-mode prediction is larger than the error value of the field mode prediction and selecting a frame orthogonal transform mode when the error value of the frame mode prediction is smaller than an error value of the field mode prediction;

(2) a video coding device as defined in item (1), characterized in that the orthogonal transform mode selecting portion has comparing means to compare an error value of the frame mode prediction with an error value of the field mode prediction error;

(3) a video coding device as defined in item (1), characterized in that the orthogonal transform mode selecting portion has calculating means for calculating a motion value from a motion vector determined for estimating the motion and comparing means for comparing the calculated motion value with a given value, and selects a field orthogonal transform mode when the motion value is larger than the given value and selects a frame orthogonal transform mode when the motion value is smaller than the given value;

(4) a video coding device as defined in item (3), characterized in that the maximum motion value corresponding to respective motion vectors calculated for one macro block is selected as the motion value of said macro block;

(5) a video coding device as defined in item (3), characterized in that a total of motion values corresponding to respective motion vectors calculated for one macro block is selected as the motion value of said macro block;

(6) a video coding device as defined in any of items (3) to (5), characterized in that a total of absolute values of vertical components and a horizontal components of motion vectors is selected as the motion value;

(7) a video coding device as defined in any of items (3) to (5), characterized in that a total of absolute values of vertical components and a horizontal components of motion vectors is selected as the motion value;

(8) a video coding device as defined in item (1), characterized in that the selection of the frame orthogonal transform mode or the field orthogonal transform mode is made in such a way that the frame orthogonal transform mode is selected when frame prediction mode is selected for the codable block and the field orthogonal transform mode is selected when the field prediction mode is selected for the codable block;

(9) a video coding device as defined in any of items (3) to (8), characterized in that the motion vector estimation is carried out for all codable blocks in a frame even if a part or all of codable blocks of the frame are encoded in intraframe coding mode.

A video coding device according to the present invention is of the type which is capable of performing the interframe video coding with adaptively selecting either frame or field orthogonal transform mode by using a prediction error value of the frame predictive mode, a prediction error value of the field predictive mode and motion vectors, and which is featured by the followings:

(1) The prediction error values calculated respectively in the frame prediction mode and in the field prediction mode are compared with each other to determine which one is larger than the other and the orthogonal transform mode is selected as follows: The field orthogonal transform mode is selected when the following inequality (4) as to specified functions f(x) and g(y) is established:

$$f(x) > g(y) \qquad (4)$$

where x is a prediction error value in frame prediction mode and y is a prediction error value in field prediction mode. The greater than sign (>) in the inequality (4) may be replaced by the greater than/equal sign ($\geq$). If the inequality (4) is not established, the frame orthogonal transform mode is selected.

The above-mentioned judgment is based on such a known fact that:

with the prediction error value of the frame prediction mode being smaller than the prediction error value in the field prediction mode, the frame image has more highly correlated adjacent lines than the field image has and the orthogonal transform is preferably made for each frame to attain the power concentration to low frequency, whereas with the prediction error value of the field prediction mode smaller than that of the frame prediction mode, the field image has more highly correlated adjacent lines than the frame image has and the orthogonal transform is preferably made for each field to attain the power concentration to low frequency.

(2) A motion value is calculated from a motion vector obtained by motion prediction and it is compared with a specified value. The orthogonal transform mode is selected according to whether the calculated value is larger than the specified value or not. With the motion value being larger than the specified, the interfield motion is large and the correlation between the adjacent lines is reduced. If the orthogonal transform is now performed for a unit frame, unwanted vertical high-frequency components may be easily produced. Therefore, under the above-mentioned condition, the orthogonal transform is preferably conducted for a unit field. On the other hand, when the motion value is small, the interfield motion value is considered to be small. In this case, the correlation between adjacent lines in each block is high and the orthogonal transform may be effectively made for a unit frame in view of attaining the power concentration to a low frequency range. On the above-mentioned reason, the frame orthogonal transform mode is selected when the motion value is smaller than the specified value, whereas the field orthogonal transform mode is selected when the motion value is larger than the specified value.

(3) The orthogonal transform mode is decided according to the selection of the frame or field prediction mode for the motion prediction. Namely, the frame orthogonal transform mode is applied when the frame prediction mode is selected, whereas the field orthogonal mode is applied when the field prediction mode is selected.

(4) The motion prediction is performed irrespective of the intraframe-coded frame and interframe-prediction coded frame. Information obtained by the motion prediction is applied to any one of methods to select either the frame or field orthogonal transform mode.

Figure 6:
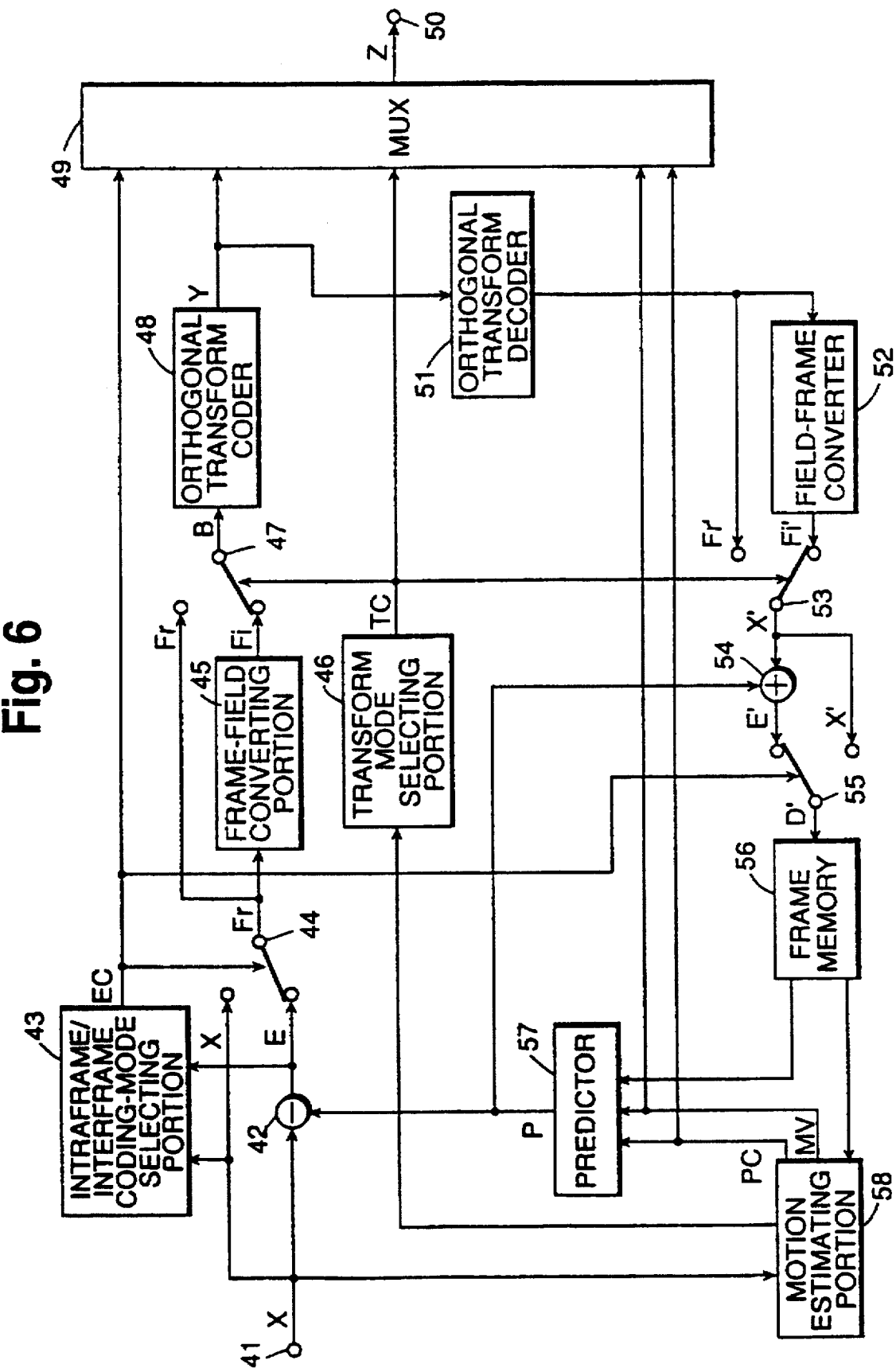
FIG. 6 is a block diagram for explaining a video coding device embodying the present invention.

Referring now to the accompanying drawings, preferred embodiments of the present invention will be described in detail as follows:

FIG. 6 is a block diagram for explaining a video coding device embodying the present invention, which comprises an input terminal 41, a subtracter 42, intraframe-interframe coding mode selecting portion 43, a change-over switch 44, a frame-to-field converting portion 45, an orthogonal transform mode selecting portion 46, a change-over switch 47, an orthogonal transform coder 48, a multiplexor (MUX) 49, an output terminal 50, an orthogonal transform decoder 51, a field-to-frame converter 52, a change-over switch 53, an adder 54, a change-over switch 55, a frame memory 56, a predictor 57 and a motion estimating portion 58.

The coding procedure is the same as the conventional example of FIG. 1. A frame to be coded is divided into macro-blocks of 2N×2N pixels which are inputted into the device through the input terminal 41. Each macro-block denoted by X has an interlaced structure. Namely, its odd-numbered lines correspond to pixels of odd-numbered fields and even-numbered lines correspond to pixels of even-numbered fields.

By using the macro-block X and a reference frame stored in the frame memory 56, the motion estimating portion 58 determines a motion vector MV and, at the same time, decides which mode of prediction to be made per frame or field and produces a prediction mode selecting signal PC. The prediction to be made per frame is called frame prediction mode and the prediction per field is called field prediction mode. The number of motion vectors is one per macro-block for frame prediction mode and two per macro-block (one vector for an odd-numbered field and one vector for an even-numbered field) for field prediction mode. For bidirectional prediction referring to preceding and succeeding reference frames, the number of vectors is two times the above-mentioned corresponding number.

The predictor 57 calculates a predicted macro-block P by using a motion vector MV according to a prediction mode selecting signal PC. The subtracter 42 determines a difference between macro-blocks X and P to obtain a interframe differential macro-block E. The intraframe-interframe coding-mode selecting portion 43 compares the macro-block X with the macro-block E, decides which macro-block X or E is to be encoded and generates a coding-mode selecting signal EC to operate the change-over switch 44. The intraframe coding mode is applied when X is selected and the interframe mode is applied when E is selected. The macro-block selected by the change-over switch 44 is designated by Fr. This macro-block Fr has an interlaced structure.

The macro-block Fr is transferred to the field converter 45 wherein it is subjected to frame-to-field conversion. The converted macro-block is denoted by Fi. The upper half of the macro-block Fi is composed of 2N×N pixels of the odd-numbered fields and the lower half is composed of 2N×N pixels of the even-numbered fields.

An orthogonal transform-mode selecting signal TC is generated to control change-over switch 47 to select either one of macro-blocks Fr and Fi. The orthogonal transform coder 48 encodes the selected macro-block B of 2N×2N pixels by orthogonal transformation in 4 blocks (upper left, upper right, lower left and a lower right), each having N×N pixels. The frame orthogonal transform coding mode is applied when Fr is selected and the field orthogonal transform coding mode is applied when Fi is selected.

An output Y of the orthogonal transform coder 48 is multiplexed with the mode signals TC, EC and PC and a motion vector MV by the multiplexor 49 which generates, at its output terminal 50, a multiplexed output Z to be transmitted or recorded. To obtain an image reproducible at a decoding side, a coding side performs the decoding operation simultaneously with the coding operation and a decoded macro-block is stored in the frame memory 56. The encoded data Y enters into the orthogonal transform decoder 51 which decodes the data by orthogonal transformation and obtains a decoded macro-block Fr'.

The field-to-frame converter 52 converts the macro-block Fr' into frame arrangement by reversing the procedure of the frame-to-field conversion. The converted macro-block is denoted by Fi'. Either of the macro-blocks Fr' and Fi' is selected by the change-over switch 53 according to the orthogonal transform mode selecting signal TC. The macro-block Fr' is selected for the frame orthogonal transform mode and the macro-block Fi' is selected for the field orthogonal transform mode.

The adder 54 adds a selected macro-block X' to a predictive macro-block P to obtain a resulting macro-block E'. Either of the macro-blocks X' and E' is selected by the change-over switch 55 according to the intraframe-interframe coding mode selecting signal EC. The macro-block X' is selected for the intraframe coding mode and the macro-block E' is selected for the interframe coding mode. A decoded macro-block D' is thus obtained. On completion of processing one frame, a completely decoded frame is obtained, which will be used as a reference frame for coding a succeeding frame.

The embodiment of FIG. 6 differs from the conventional device of FIG. 1 by the orthogonal transform mode selecting portion 46 of the FIG. 6 which receives input information generated by the motion estimating portion 58 while the orthogonal transform mode selecting portion 6 of FIG. 1 receives macro-blocks Fr and F1.

In the conventional device, the motion estimating portion 18 does not work for an intraframe-coded frame whose macro-blocks are all to be encoded in the intraframe coding mode. Furthermore, in the intraframe coding mode, information generated by the motion estimating portion is not used for coding even when treating with any other frame than the intraframe-coded frame. On the contrary, in the embodiment of the present invention, the motion estimating portion 58 in the above-mentioned cases operates to generate information for selecting the orthogonal transform mode. Of course, this may never bring any increase in the hardware since the existing portion is used.

It is also possible to fix the orthogonal transform mode in the intraframe coding mode to the frame orthogonal transform mode or the field orthogonal transform mode (although the embodiment is not so designed). In this case, the intraframe-coded frame does not require the operation of the motion estimating portion 58. This may save the power consumption of the device but may not realize the adaptive application of the orthogonal transform mode, resulting in decreasing coding efficiency and reproducible image quality. The present embodiment can apply the suitable orthogonal transform to each macro-block in the intraframe mode according to the estimated motion value to improve the coding characteristic.

Figure 7:
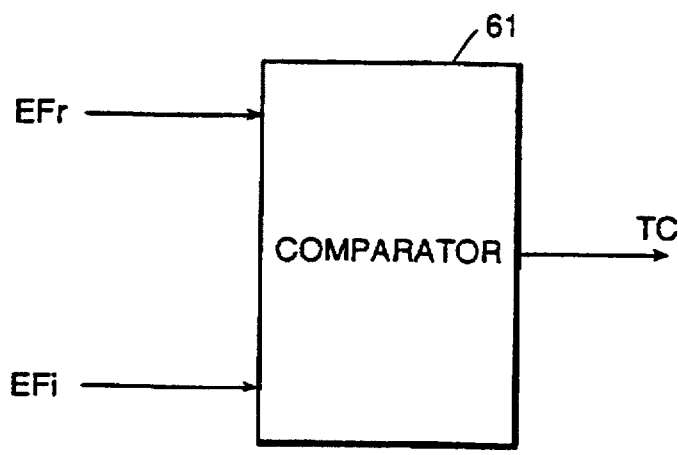
FIG. 7 is a block diagram showing an embodiment of an orthogonal transform-mode selecting portion of the device shown in FIG. 6.

FIG. 7 is a block diagram showing an example of the orthogonal transform mode selecting portion shown in FIG. 6. In FIG. 7, numeral 61 designates a comparator. In this example, prediction error values calculated by the motion estimating portion 58 are used for judgment of selecting the frame orthogonal transform mode or the field orthogonal transform mode. In this case, the comparator 61 receives a prediction error value EFr of the frame prediction and a prediction error value EFi of the field prediction and compares them. An orthogonal transform mode changing-over signal TC is generated according to the comparison result. The prediction error value of the field prediction is a total of a prediction error value for an odd-numbered field and a prediction error value for an even-numbered field.

Figure 8:
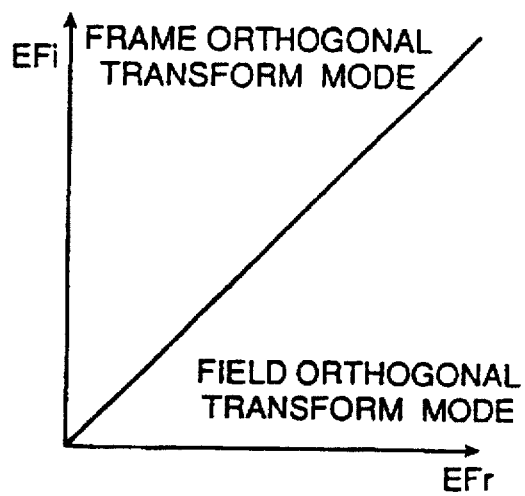
FIG. 8 shows output characteristics of an comparator of the device shown in FIG. 7.

As is apparent from FIGS. 6 and 7, the embodiment of the present invention eliminates the need for adders and related components shown in FIG. 5 for the conventional device. Namely, it may have a considerably saved hardware. Furthermore, in comparison with the conventional device using a pixel-value of a macro-block for judgment, the present embodiment uses a prediction error value only, thereby reducing the quantity of data to be processed for judgment. The necessary processing time is correspondingly shortened. FIG. 8 shows an output characteristic of the comparator of FIG. 7. The characteristic curve is obtained when the equation (4) has the following expressions (5):

$$f(x)=x$$
$$g(y)=y \quad (5)$$

A judgment is made according to the category whereto the prediction error value EFr of the frame prediction and the prediction value EFi of the field prediction belong when they are plotted on the diagram of FIG. 8. When plotted points lying on a straight line on the diagram, the selection of the frame or field prediction mode depends on the expression (4) having a greater than sign (>) or a greater than/equal sign ($\geq$). In the present embodiment, the mode selection judgment is made using only the inequality relation between the prediction error values EFr and EFi. Of course, many other kinds of functions can be used as f(x) and g(y).

Figure 9:
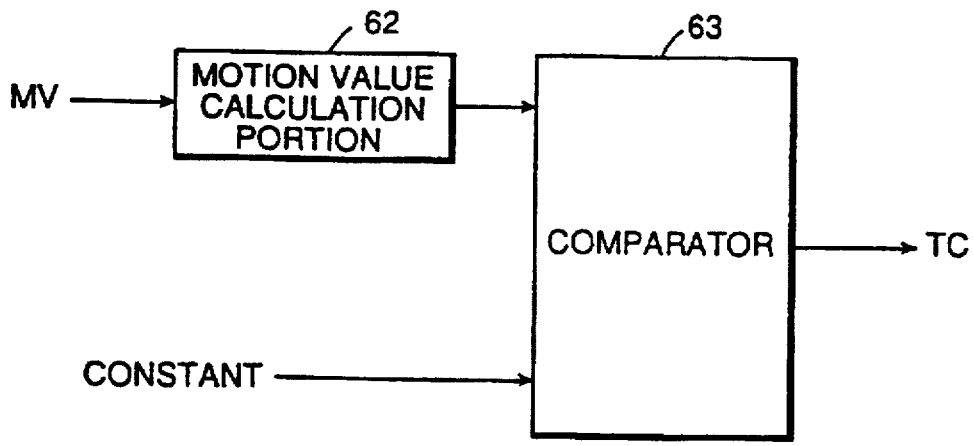
FIG. 9 is a block diagram showing another embodiment of an orthogonal transformation-mode selecting portion of the device shown in FIG. 6.

FIG. 9 shows another example of the orthogonal transform mode selecting portion shown in FIG. 6. In FIG. 9, numeral 62 designates a motion value calculating portion and numeral 63 designates a comparator.

In this embodiment, a motion vector calculated by the motion estimating portion of FIG. 6 is used for judgment of the orthogonal transform mode selection. The motion value calculating portion 62 receives a motion vector MV and calculates a motion value of a macro-block therefrom. The comparator 63 receives the calculated motion value and compares it with a specified constant. The orthogonal transform mode is determined according to the comparison result. Namely, the frame orthogonal transform mode is selected if the motion value is smaller than the constant. If not so, the field orthogonal transform mode is selected.

Figure 10:
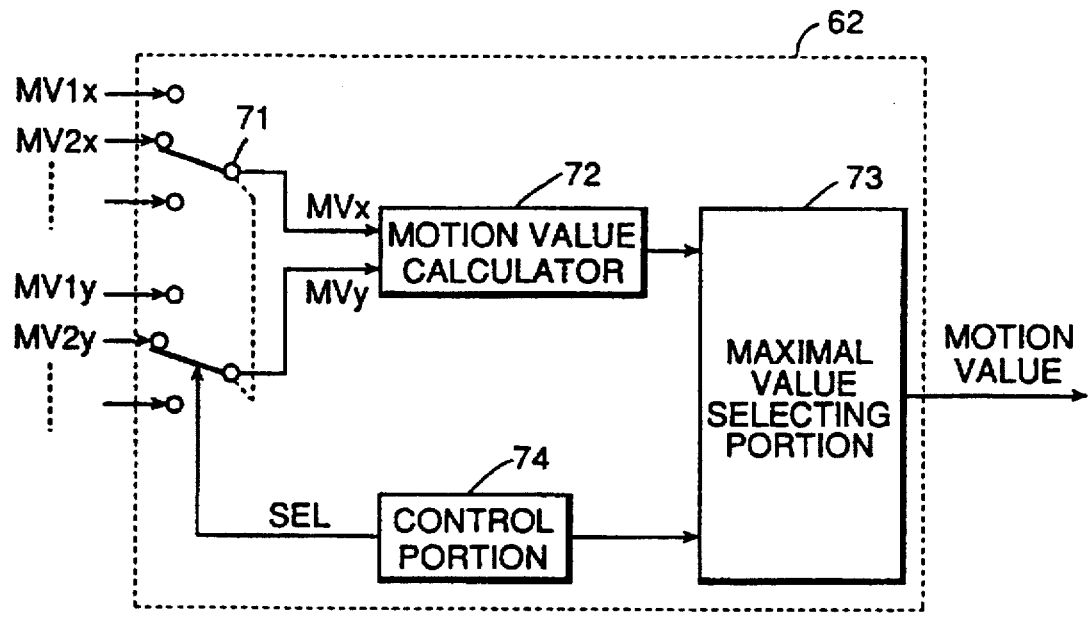
FIG. 10 is a block diagram showing an embodiment of a motion-value calculating portion shown in FIG. 9.

FIG. 10 shows an example of the motion value calculating portion 62 shown in FIG. 9. In FIG. 10, numeral 71 designates a change-over switch, 72 a motion value calculator, 73 a maximal value selecting unit and 74 a control unit.

Horizontal and vertical components of motion vectors to be inputted into the motion value calculating portion 62 are designated respectively by (MV1x, MV1y), (MV2x, MV2y) and so on. A sequence of MV1 (=(MV1x, MV1y)), MV2 (=(MV2x, MV2y)) and so on corresponds to a sequence of all motion vectors of, e.g., the frame prediction or the field prediction for even-numbered fields, which are obtained by the motion estimating portion 58 shown in FIG. 6.

The control unit 74 operates the change-over switch 71 to enter the motion vectors (MV1, MV2 and so on) one by one into the motion value calculator. A horizontal component of each vector is indicated by MVx and a vertical component is indicated by MVy. The motion value calculator 72 subsequently calculates motion values corresponding to respective motion vectors. The maximal value selecting unit 73 compares the subsequently calculated motion values with each other and determines a maximal value among them, which is used as a motion value of the macro-block.

Figure 11:
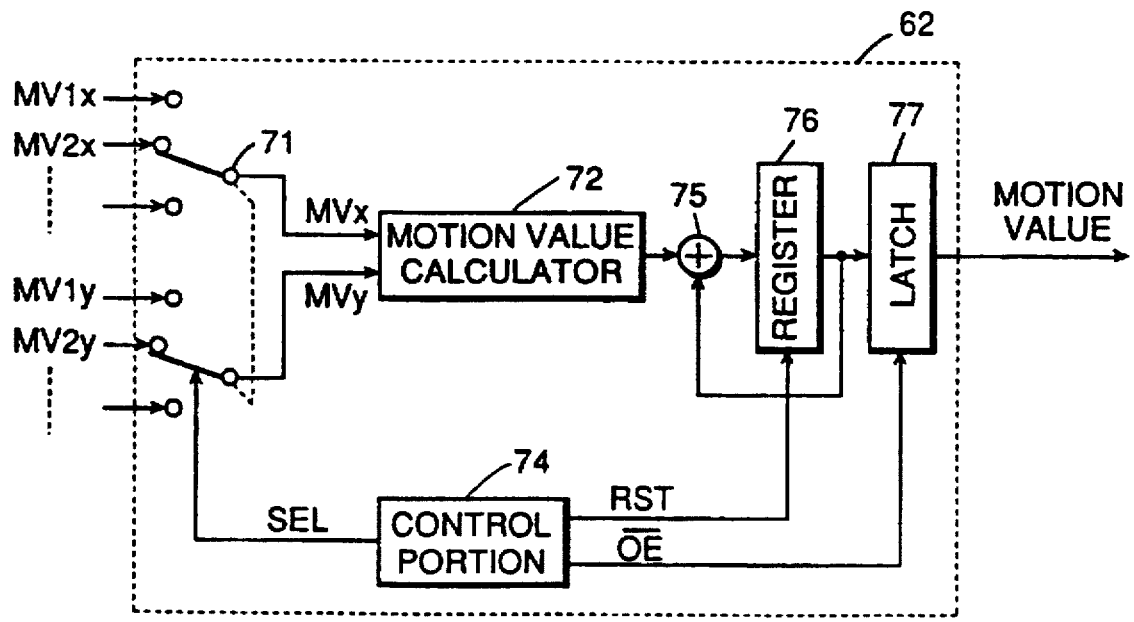
FIG. 11 is a block diagram showing another embodiment of a motion value calculating portion shown in FIG. 9.

FIG. 11 shows another example of the motion value calculating portion shown in FIG. 9. In FIG. 11, numeral 75 designates an adder, 76 a register and 77 a latch. Other components similar in function to those of FIG. 10 are indicated by the same reference numbers.

All motion vectors are inputted one by one into the motion value calculator 72. The adder 75 and the register 76 constitutes an accumulator. The total sum of the motion values of the motion vectors is defined as a motion value of the macro-block. The latch 77 is controlled so as to hold the total sum. On completion of fixing the total sum at the latch 77, the register 76 is reset for succeeding accumulating operation.

Figure 12:
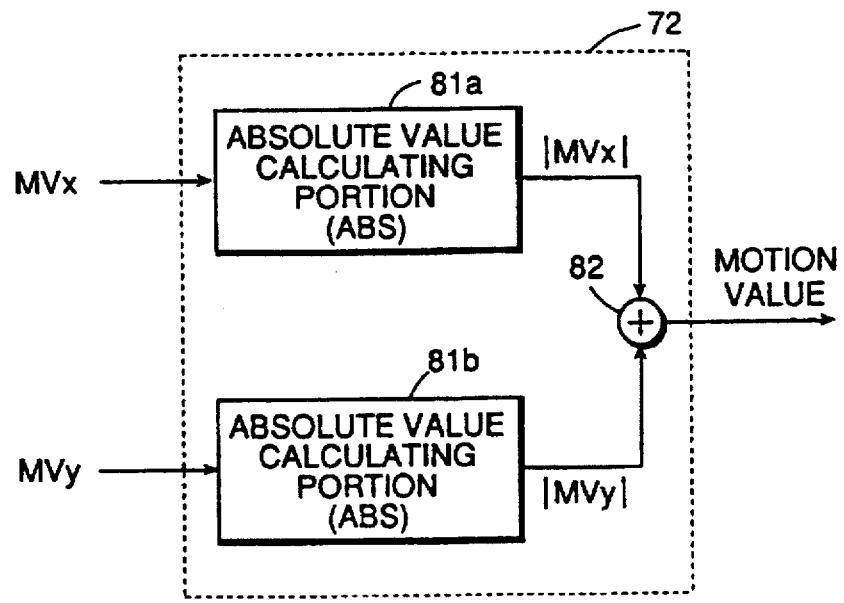
FIG. 12 is a block diagram showing an embodiment of a motion-value calculator shown in FIG. 11.

FIG. 12 shows an example of the motion value calculator shown in FIGS. 10 and 11. In FIG. 12, numerals 81a and 81b designate absolute value (ABS) calculators and numeral 82 designates an adder.

The ABS calculators 81a and 81b calculate an absolute value |MVx| of a horizontal component MVx and an absolute value |MVy| of a vertical component MVy, and the adder 82 calculates a sum of the absolute values. A calculation result |MVx|+|MVy| is outputted as a motion value of a macro-block. The ABS calculation with the sign inversion may be done by inverting the all bits and adding 1 if each vector component is expressed as a complement of 2.

Figure 13:
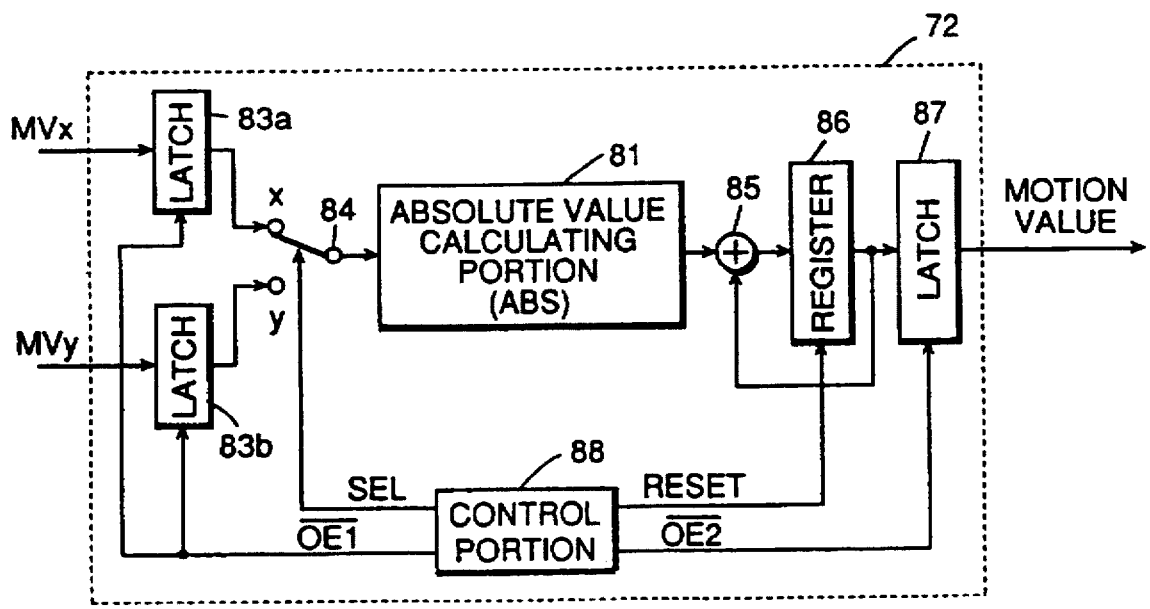
FIG. 13 is a block diagram showing another embodiment of a motion-value calculator shown in FIG. 11.

FIG. 13 shows another example of the motion value calculator shown in FIGS. 10 and 11. In FIG. 13, there are shown latches 83a and 83b, a change-over switch 84, an adder 85, a register 86, a latch 87 and a control unit 88.

This calculator is similar to the calculator of FIG. 12 in using |MVx|+|MVy| as a motion value, but it may commonly use an ABS calculator 81 for MVx and MVy by time-difference processing to save the size of the hardware. The reason the present embodiment can conduct the time-difference processing is as follows: In comparison with the prior art device that has to process a large number of pixel values of a macro-block for selecting the orthogonal transform mode, the present embodiment may process a considerably reduced number of motion vectors for the same purpose, producing a time allowance for inputting the data into the orthogonal transform mode selecting portion. The reduction of the quantity of data necessary for judgment may reduce the number of operations and save the processing time.

Figure 14A:
FIG. 14 shows an example of timing chart of data and control signal in the calculator shown in FIG. 13.

FIGS. 14(a) to 14(g) are illustrative of a timing chart of control signal and data in the embodiment of FIG. 13. A horizontal component MVx and a vertical component MVy of a motion vector inputted into the motion value calculator 72 are held by the latches 83a and 83b respectively. In this case, the latches receive data when inverted OE1 shown in FIG. 14(a) is shifted from low to high. The data held by the latches are inputted into the ABS calculator 81 by the action of the change-over switch at a specified time interval. An output of the ABS calculator 81 is accumulatively added by the adder 85 and the register 86. The latch 87 is controlled to hold a value of |MVx|+|MVy| only. The control unit controls the above-mentioned sequential operations.

When the portions shown in FIGS. 11 and 13 are combined, the adder 85, register 86 and latch 87 of the FIG. 13 are integrated respectively with the adder 75, register 76 and latch 77 of FIG. 11. By doing so, the hardware of the device according to the present invention can be further saved in size.

Figure 15:
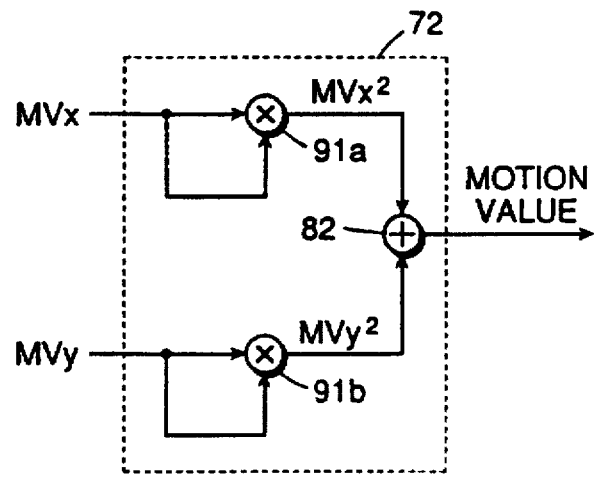
FIG. 15 is a block diagram showing a further embodiment of a motion-value calculator shown in FIG. 11.

FIG. 15 shows another example of the motion value calculator shown in FIGS. 10 and 11. In FIG. 15, numerals 91a and 91b designate multipliers. Other portions similar in function to those shown in FIG. 12 are given the same reference numerals.

In the present embodiment, a horizontal component MVx and a vertical component MVy of each motion vector are squared respectively by the corresponding multipliers 91a and 91b and a total of the squared values, i.e., $MVx^2+MVy^2$ is outputted as a motion value of a macro-block.

Figure 16:
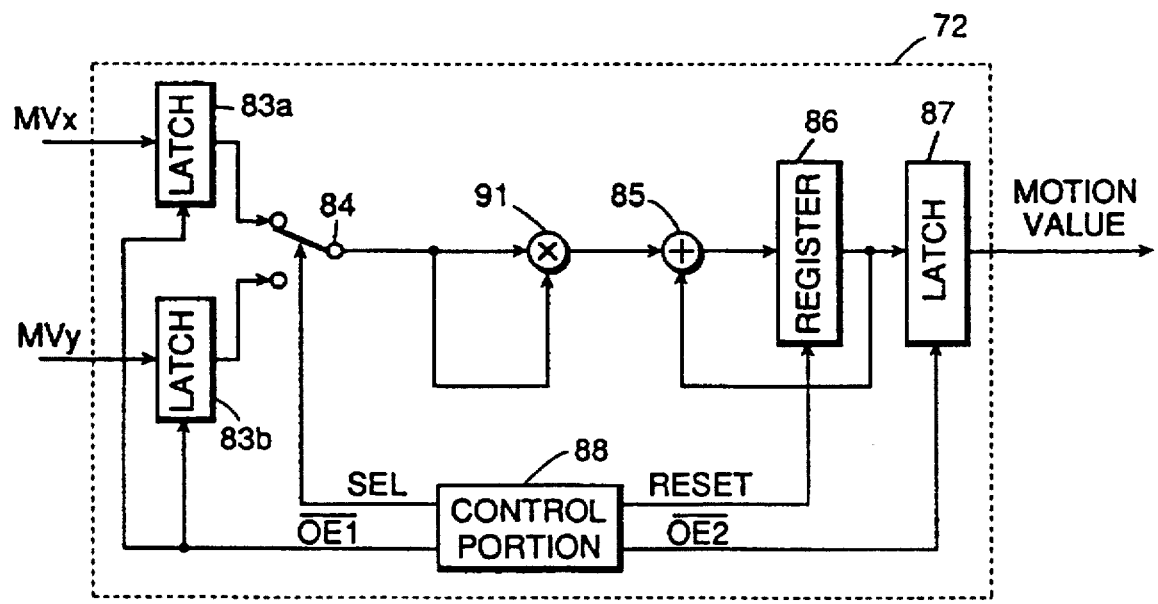
FIG. 16 is a block diagram showing another embodiment of a motion-value calculator shown in FIG. 11.

FIG. 16 shows a further example of the motion value calculator shown in FIGS. 10 and 11. In FIG. 16, numeral 91 designates a multiplier and other portions similar in function to those of FIG. 12 are given the same references.

The operation of this calculator is the same as described for the calculator of FIG. 13. It uses the same motion value $MVx^2+MVy^2$ as described in the embodiment of FIG. 15. A multiplier is also used commonly for determining MVx and MVy at a specified time interval in order to save the scale of the hardware.

Figure 17:
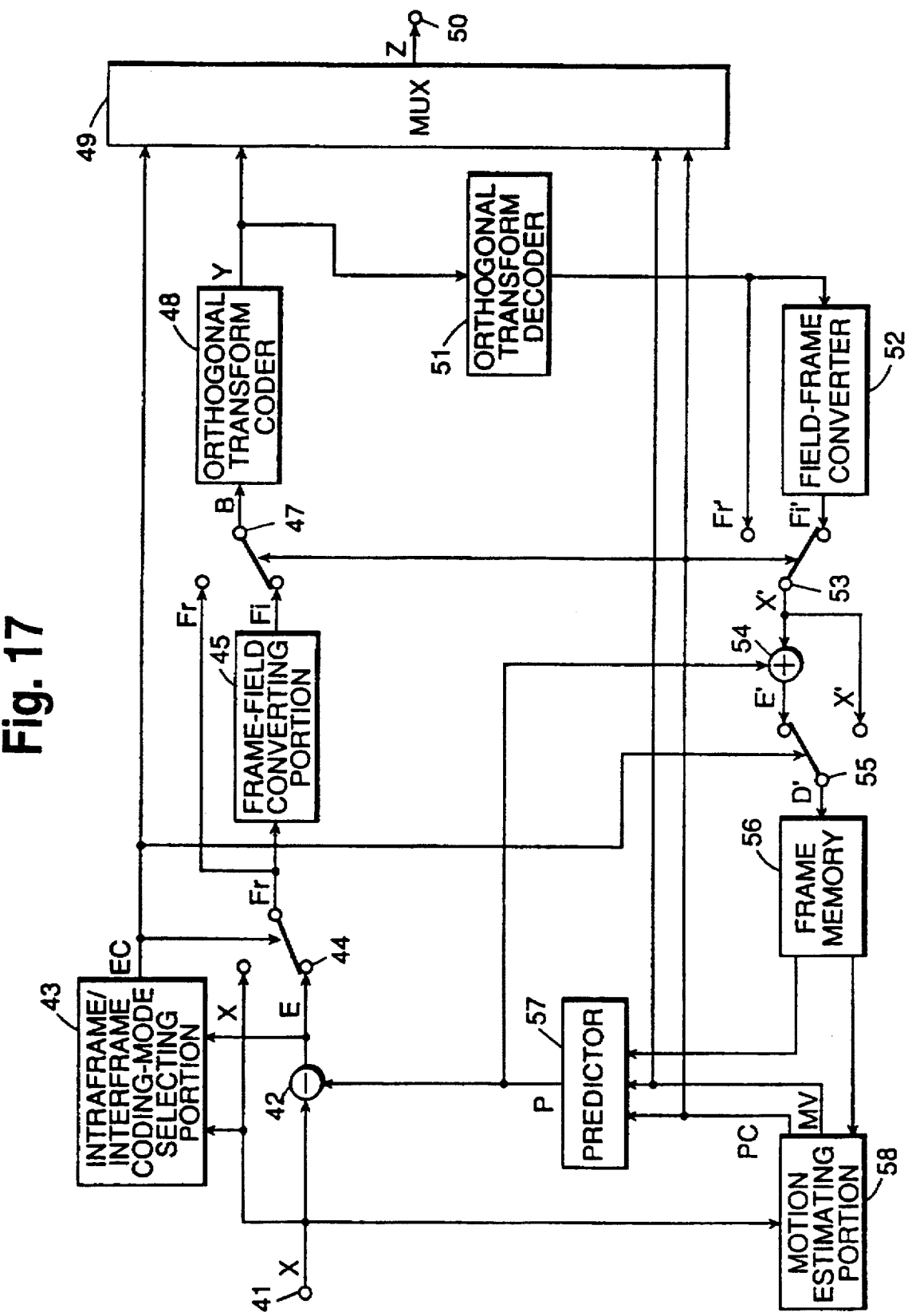
FIG. 17 is a block diagram for explaining another embodiment of a video coding device according to the present invention.

FIG. 17 is a block diagram showing another embodiment of a video coding device according to the present invention, where the portions are shown with the same reference numbers as like portions of FIG. 6. The coding procedure is just the same as described for the embodiment of FIG. 6. The present embodiment may omit the orthogonal transform mode control 46 and the orthogonal transform mode signal TC, which are shown in FIG. 6, and use a prediction mode signal, in place of the signal TC, to control change-over switches 47 and 53. Namely, the frame orthogonal transform mode is selected when the signal PC indicates the frame prediction mode and the field orthogonal transform mode is selected when the signal PC indicates the field prediction mode. Consequently, in comparison with the conventional device, this embodiment of FIG. 17 has a considerably reduced in size of hardware by omitting the orthogonal transform mode selecting portion 6 of the prior art device.

As is apparent from the foregoing, the present invention has the following advantages:

(1) In comparison with the conventional device that uses a pixel value of each macro-block as data for judgment on selecting the orthogonal transform mode, the video coding device according to the present invention uses motion prediction error values or motion vectors for the same purpose and, thereby, may process a reduced quantity of data with results of considerably saving a processing time necessary for selecting the orthogonal transform mode and of considerably reducing the size of the necessary hardware.

(2) The transform mode selecting portion is composed of a comparator. Namely, there is no need for the multiplier and the adder used in the prior art device. This may considerably reduce the size of the necessary hardware.

(3) By using motion vectors for judgment of the orthogonal transform mode to be selected it becomes possible to reduce a quantity of multipliers, adders and subtracters in comparison with the conventional device, thereby attaining a considerably reduction in its hardware size.

(4) By directly applying the result of selecting the frame or field prediction mode to the selection of the frame or field orthogonal transform mode, the device according to the present invention may completely omit the transform mode selecting portion, which is used in the prior art device, thereby realizing further reduction of its hardware size.

(5) For a intraframe-coded frame which macro-blocks are all to be coded in intraframe coding mode, the present invention uses the motion estimating portion for selecting the orthogonal transform mode, while the same portion is at standstill in the prior art device. This makes it possible to use a motion information of the intraframe-coded frame to select a suitable one of the frame orthogonal transform mode and the field orthogonal transform mode for each macro-block of the intraframe-coded frame. Furthermore, the above-mentioned processing is performed by the existing motion estimating portion, i.e., there is no need of increasing the size of its hardware. In comparison with the prior art device that uses the fixed frame or field orthogonal transform mode for the intraframe-coded frame, the present inventive device that selectively apply suitable one of the frame orthogonal transform mode and the field orthogonal transform mode may have a signal-to-noise ratio improved by 0.3 db frame on an average by simulation. The considerable improvement of the image quality has been recognized by the subjective evaluation. The above-mentioned simulation results were obtained by applying the standard coding method called "test model" used for standardizing according to the international video coding standard MPEG-2 to 60 frames of a test image "cheerleader." The effect of the image quality improvement according to the present invention is not only limited to the intraframe-coded frame but also spreads to all other interframe-coded frame to be predicted from the intraframe-coded frame.

(6) As described above, the present inventive device can eliminate most processing operations necessary for selecting the orthogonal transform mode, which has required, heretofore, a large hardware, by using the motion information from the motion estimating portion for selecting the frame or field orthogonal transform mode. This feature has a good and considerable effect.

We claim:

1. A video coding device capable of dividing each frame of a video sequence obtained by interlaced scanning into codable blocks and generating an image block predicted from a preceding-frame and a succeeding frame by using motion vectors to be determined by estimation, said estimation being performed in one of two selectable modes comprising a frame prediction mode to predict by using a motion vector per codable block and a field prediction mode to predict by using a motion vector per odd-numbered field comprising odd-numbered lines and by using a motion vector per even-numbered field comprising even-numbered lines, said device including a motion estimation circuit for determining an error value of frame mode prediction and an error value of field mode prediction and an orthogonal transform mode selecting circuit for adaptively selecting a field orthogonal transform mode when the error value of the frame-mode prediction is larger than the error value of the field mode prediction and selecting a frame orthogonal transform mode when the error value of the frame mode prediction is smaller than an error value of the field mode prediction and wherein the orthogonal transform mode selecting circuit is responsive only to the error value of the frame mode prediction and the error value of the field mode prediction produced by said motion estimating circuit.

2. A video coding device as in claim 1 wherein the error value of the field mode prediction is the total error value for both the odd-numbered and even-numbered fields.

3. A video coding device as defined in claim 1, characterized in that the orthogonal transform mode selecting circuit has comparing means to compare an error value of the frame mode prediction with an error value of the field mode prediction.

4. A video coding device as in claim 3 wherein the comparing means has an output characteristic of $f(x) \geq g(y)$ where x is the error value in the flame-mode prediction and y is the error value in the field mode prediction.

5. A video coding device as in claim 4 wherein $f(x)=x$ and $f(y)=y$.

* * * * *